Patented June 2, 1931

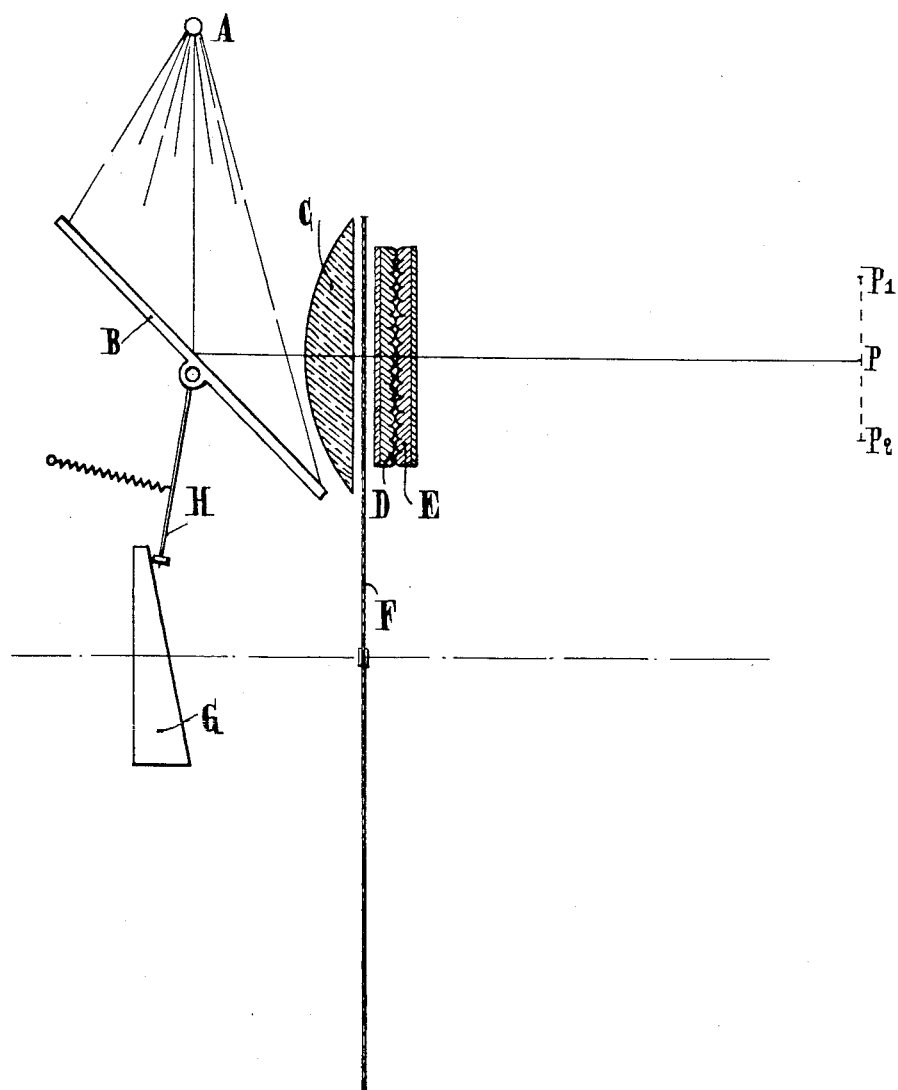

1,807,822

UNITED STATES PATENT OFFICE

RODOLPHE BERTHON, OF NEUILLY, FRANCE, ASSIGNOR, BY MESNE ASSIGNMENTS, TO KISLYN CORPORATION, OF NEW YORK, N. Y., A CORPORATION OF DELAWARE

REMOVAL OF WATERINGS FROM GOFFERED FILMS

Application filed June 4, 1928, Serial No. 282,754, and in France April 23, 1928.

It is known in the art that the superposing of two goffered films produces moires or waterings. This fault is especially noticeable with films having linear striations which are arranged or set parallelly.

Theoretically, however, if this fault were eliminated, nothing would stand in the way of correct copying of goffered colour films, the printing of which would be effected with the goffering of the original film laid in contact with the goffering of the copy film. As a matter of fact, the beams of light passing, in such a case, through the original film emerge therefrom as beams which intersect one another in space according to a plane corresponding to the plane of the aperture of the picture-taking objective. Said beams which are taken up by the goffering of the copy-film, will give again a new aperture on attacking the latter film and it will always be an easy matter to reconstitute this aperture in the projecting apparatus in order to restore the exact colouring of the photographed scene or picture. The object of my invention is to do away with moires, streaks or waterings as between superposed films, the invention being based on the following ascertained fact:

When, by means of a punctual light source and a condenser, light is thrown on a pair of contacting goffered films, one carrying an image and the other being a blank film, the goffering of the blank film contacting directly with that of the original film, heavily marked streaks or waterings are seen in the projection obtained and become still more in evidence when the focus of the condenser is such that the image of the light source is formed exactly in the plane of the printing aperture of the original film. I have found, however, that if the light source is shifted in a plane parallel to both films and perpendicularly to the striations or linear refracting elements thereof, the streaks or waterings are shifted too. To a shifting of the light source such that the image of said source will travel along the whole diameter of the original film printing aperture, there will correspond a shifting of the waterings equal to their normal period in stationary condition. A shifting of this extent amounts to removal of the waterings since they cannot then be printed on any point of the blank film where printing takes places.

Hence my invention comprises a device or arrangement to be employed with contact printing machines and which is diagrammatically illustrated in the accompanying drawing, wherein:

A is a punctual source of light; B is a rocking mirror; C is a condenser giving the image from the source on plane $P_1$, P, $P_2$; D is the original film to be copied; E is the blank copying film.

The shifting or moving image-by-image of films D and E is controlled by the ordinary mechanism used for the purpose with printers and, therefore, need not be fully illustrated. The same mechanism that drives shutter F, controls, by means of a cam G and a connecting-rod H, the rocking of mirror B, the amplitude of this rocking being such that the image of source A will travel along the whole diameter of the printing aperture $P_1$, $P_2$ during the exposure of each image. In such conditions no streak or watering can be printed on blank film E.

Of course, the cam or the connecting-rod that controls the rocking of mirror B should be so timed that the rocking phases will coincide with the opening and closing phases of the shutter.

Without departing in any way from the principle, I might, obviously, do away with the mirror and arrange for controlling a shifting of the lamp or source of light itself.

I claim as my invention:

1. A method of copying by contact films having a goffering composed of parallel lines constituting microscopic refracting elements, which consists in arranging the goffered original film and a similarly-goffered blank film in contact; exposing the blank film, through the original film, to the action of a beam of light from a light source; and shifting the image of said source, during the exposure, along a certain definite diameter that is perpendicular to the lenticular elements in a manner to cause said image to occupy all the points of that diameter of the printing aperture of the picture-taking objective.

2. A method of copying by contact films having a goffering composed of parallel lines constituting microscopic refracting elements, which consists in arranging the goffered original film and a similarly-goffered blank film in contact; exposing the blank film, through the original film, to the action of a beam of light from a punctual light source; and shifting the image of said source, during the exposure, along a certain definite diameter that is perpendicular to the lenticular elements in a manner to cause said image to travel along and thereby occupy successively all the points of that diameter of the printing aperture of the picture-taking objective.

In testimony whereof I affix my signature.

RODOLPHE BERTHON.